US010823253B2

(12) United States Patent
Tomura et al.

(10) Patent No.: US 10,823,253 B2
(45) Date of Patent: Nov. 3, 2020

(54) SADDLE-TYPE VEHICLE

(71) Applicant: HONDA MOTOR CO., LTD., Tokyo (JP)

(72) Inventors: Kineo Tomura, Saitama (JP); Yotaro Mori, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 90 days.

(21) Appl. No.: 16/047,745

(22) Filed: Jul. 27, 2018

(65) Prior Publication Data

US 2019/0032746 A1    Jan. 31, 2019

(30) Foreign Application Priority Data

Jul. 31, 2017    (JP) .................................. 2017-148284

(51) Int. Cl.
  *B60G 17/04*    (2006.01)
  *F16F 9/56*    (2006.01)
  (Continued)

(52) U.S. Cl.
  CPC ................ *F16F 9/56* (2013.01); *B60G 17/04* (2013.01); *B62K 25/04* (2013.01); *B62K 25/283* (2013.01);
  (Continued)

(58) Field of Classification Search
  CPC ............................ B62K 25/04; B62K 25/283; B62K 2025/048; B62K 2025/044; B62K 25/005;
  (Continued)

(56) References Cited

U.S. PATENT DOCUMENTS 4,568,101 A * 2/1986 Bleustein ........... B60G 17/0152
                                                      180/219
5,086,866 A * 2/1992 Banjo .................. B60G 17/017
                                                      180/219
(Continued)

FOREIGN PATENT DOCUMENTS

DE    3930966 A1    3/1990
EP    0424942 A1    5/1991
(Continued)

OTHER PUBLICATIONS

Dec. 19, 2018, European Search Report issued for related EP Application No. 18186651.8.

*Primary Examiner* — Timothy Wilhelm
(74) *Attorney, Agent, or Firm* — Paratus Law Group, PLLC (57) ABSTRACT

A saddle-type vehicle includes a vehicle body frame including a main frame extending obliquely rearward and downward from a head pipe, a down frame extending downward from the head pipe and supporting an engine, and a seat frame extending rearward from the main frame and supporting a riding seat, wherein a front wheel is supported by a front portion of the vehicle body frame via a front fork, and a rear wheel is supported by a rear portion of the vehicle body frame via a swing arm, and a vehicle height adjustment device provided below the seat frame to elastically support the seat frame and configured to adjust a height of the seat frame. The vehicle height adjustment device includes an actuator unit and a cushion unit. The actuator unit is disposed between the cushion unit and the engine.

3 Claims, 9 Drawing Sheets

US 10,823,253 B2
Page 2

(51) Int. Cl.
*B62K 25/04* (2006.01)
*B62K 25/28* (2006.01)
*B62K 25/00* (2006.01)
*B62K 25/10* (2006.01)
*B62J 1/08* (2006.01)

(52) U.S. Cl.
CPC .... *B60G 2202/413* (2013.01); *B60G 2300/12* (2013.01); *B60G 2500/324* (2013.01); *B62J 1/08* (2013.01); *B62J 2001/085* (2013.01); *B62K 25/005* (2013.01); *B62K 25/10* (2013.01); *B62K 2025/044* (2013.01); *B62K 2025/045* (2013.01); *B62K 2025/048* (2013.01)

(58) Field of Classification Search
CPC .. B62K 25/10; B62K 2025/045; B60G 17/04; B60G 2500/324; B60G 2202/413; B60G 2300/12; B62J 2001/085; B62J 1/08; F16F 9/56
See application file for complete search history.

(56) References Cited

U.S. PATENT DOCUMENTS

| | | | | |
|---|---|---|---|---|
| 5,211,420 A * | 5/1993 | Iwashita | ............. | B60G 15/063 180/219 |
| 5,348,112 A * | 9/1994 | Vaillancourt | .......... | B62K 25/10 180/227 |
| 5,592,999 A * | 1/1997 | Matsuura | ............ | B62K 25/283 180/227 |
| 5,711,390 A * | 1/1998 | Hikichi | ................. | B62K 11/00 180/219 |
| 6,193,005 B1 | 2/2001 | Jurrens | | |
| 6,905,126 B1 * | 6/2005 | Jurrens | ................. | B60G 15/14 280/284 |
| 7,497,294 B2 * | 3/2009 | Tsujii | ..................... | B62K 11/06 180/219 |
| 8,262,100 B2 * | 9/2012 | Thomas | .............. | B60G 17/021 188/321.11 |
| 8,408,561 B2 * | 4/2013 | Mochizuki | ........... | B60G 17/027 267/64.17 |
| 8,770,594 B2 * | 7/2014 | Tominaga | ............. | B62K 25/26 280/6.157 |
| 8,807,259 B2 * | 8/2014 | Tominaga | ............. | B62K 11/04 180/219 |
| 9,026,309 B2 * | 5/2015 | Evangelou | ......... | B60G 17/0157 701/37 |
| 9,156,514 B2 * | 10/2015 | Rowley | .................... | B62J 17/04 |
| 9,174,698 B2 * | 11/2015 | Ishikawa | ............... | B62K 25/08 |
| 9,180,746 B2 * | 11/2015 | Kasuga | .................. | B60G 17/0272 |
| 9,975,598 B2 * | 5/2018 | Bender | ................... | B60G 11/58 |
| 9,988,121 B2 * | 6/2018 | Inomata | ................... | B62J 37/00 |
| 10,358,182 B2 * | 7/2019 | Murakami | .............. | F16F 1/121 |
| 10,473,082 B2 * | 11/2019 | Nishida | ................... | F02B 61/02 |
| 2013/0015633 A1 * | 1/2013 | Nakabayashi | ........ | B62K 25/283 280/281.1 |
| 2017/0167550 A1 * | 6/2017 | Fujimoto | ................. | F01M 1/02 |
| 2017/0369119 A1 * | 12/2017 | Ashdown | ............... | B62K 25/28 |

FOREIGN PATENT DOCUMENTS

| | | |
|---|---|---|
| JP | S57-155176 A | 9/1982 |
| JP | S58-012816 A | 1/1983 |
| JP | S58-206475 A | 12/1983 |
| JP | 2011-011683 A | 1/2011 |
| WO | WO 2010/079093 A1 | 7/2010 |

* cited by examiner

SADDLE-TYPE VEHICLE

CROSS-REFERENCE TO RELATED APPLICATIONS

The present application claims the benefit of priority of Japanese Patent Application No. 2017-148284, filed on Jul. 31, 2017, the content of which is incorporated herein by reference.

TECHNICAL FIELD

The present invention relates to a straddle-type vehicle, and more particularly, to a straddle-type vehicle including a vehicle height adjustment device for adjusting a vehicle height.

BACKGROUND ART

JP-A-2011-11683 discloses a motorcycle including a vehicle height adjustment device which includes a suspension spring, a cushion unit (shock absorber) vertically movable by hydraulic pressure supplied to a jack chamber, and an actuator unit (vehicle height adjustment pump) connected to the shock absorber by a pipe of a hydraulic system, and which is capable of adjusting a vehicle height by vertically moving a seat rail by vertical movement of the shock absorber.

In the structure disclosed in JP-A-2011-11683, the cushion unit is attached to a center portion in a vehicle left-right direction near a swing axis of a swing arm which supports a rear wheel, while the actuator unit is attached to an outer side of the seat rail which supports a riding seat. That is, since the actuator unit, which is a heavy load, is attached to the outer side of the seat rail and is disposed away from an engine, there is room for improvement on weight balance.

SUMMARY

The present invention has been made in view of the above-described problems, and an aspect of the present invention provides a saddle-type vehicle in which a heavy load can be centrally disposed.

According to an embodiment of the present invention, there is provided:

(1) a saddle-type vehicle including:
a vehicle body frame including a main frame extending obliquely rearward and downward from a head pipe, a down frame extending downward from the head pipe and supporting an engine, and a seat frame extending rearward from the main frame and supporting a riding seat, wherein a front wheel is supported by a front portion of the vehicle body frame via a front fork, and wherein a rear wheel is supported by a rear portion of the vehicle body frame via a swing arm; and
a vehicle height adjustment device provided below the seat frame to elastically support the seat frame and configured to adjust a height of the seat frame,
wherein the vehicle height adjustment device includes an actuator unit and a cushion unit, and
wherein the actuator unit is disposed between the cushion unit and an engine.

(2) In the saddle-type vehicle of (1),
the actuator unit may be disposed in an engine stepped portion formed by a cylinder portion and a crankcase of the engine.

(3) The saddle-type vehicle of (2) or (3) may further include:
a starter motor,
wherein the engine, the starter motor, the actuator unit and the cushion unit may be disposed in this order from a front side of a vehicle body.

(4) In the saddle-type vehicle of any one of (1) to (3),
the actuator unit may include a cylinder and a motor,
the cylinder and the motor may have a same axis line, and
the axis line may extend in a left-right direction of the vehicle.

(5) In the saddle-type vehicle of any one of (1) to (4),
the actuator unit may be supported by a left frame and a right frame of the vehicle body frame on both sides of an axial direction.

Effects

According to the saddle-type vehicle of (1), the actuator unit is disposed between the cushion unit and the engine, the actuator unit can be disposed near a gravity center of the vehicle body and a heavy load can be centralized on a gravity center of the vehicle body accordingly. Therefore, weight balance of the vehicle can be improved.

According to the saddle-type vehicle of (2), the actuator unit is disposed in the engine stepped portion formed by the cylinder portion and the crankcase of the engine. Therefore, the actuator unit can be disposed by utilizing the stepped portion formed by the cylinder portion and the crankcase of the engine and a layout property is better.

According to the saddle-type vehicle of (3), the engine, the starter motor, the actuator unit and the cushion unit are disposed in this order from the front side of the vehicle body. Therefore, the layout property is better and the heavy load can be centralized on the gravity center of the vehicle body.

According to the saddle-type vehicle of (4), the actuator unit includes the cylinder and the motor which have the same axis line extending in the left-right direction of the vehicle. Therefore, the layout property is better and the weight balance on the left and right can be improved.

According to the saddle-type vehicle of (5), the actuator unit is supported by the left frame and the right frame of the vehicle body frame on both sides of the axial direction. Therefore, the actuator unit is securely fixed across the left frame and the right frame and vibration resistance thereof can be enhanced. Further, the occurrence of moment can be suppressed.

DESCRIPTION OF EMBODIMENTS

Hereinafter, a motorcycle which is a saddle-type vehicle according to an embodiment of the present invention will be described with reference to FIGS. 1 to 9. The drawings should be seen based on a direction of reference numerals. In the following description, front and rear, left and right, and upper and lower are described according to the direction seen from a driver. In the drawings, the front side of the vehicle is denoted as Fr, the rear side is denoted as Rr, the left side is denoted as L, the right side is denoted as R, the upper side is denoted as U, and the lower side is denoted as D.

Figure 1:
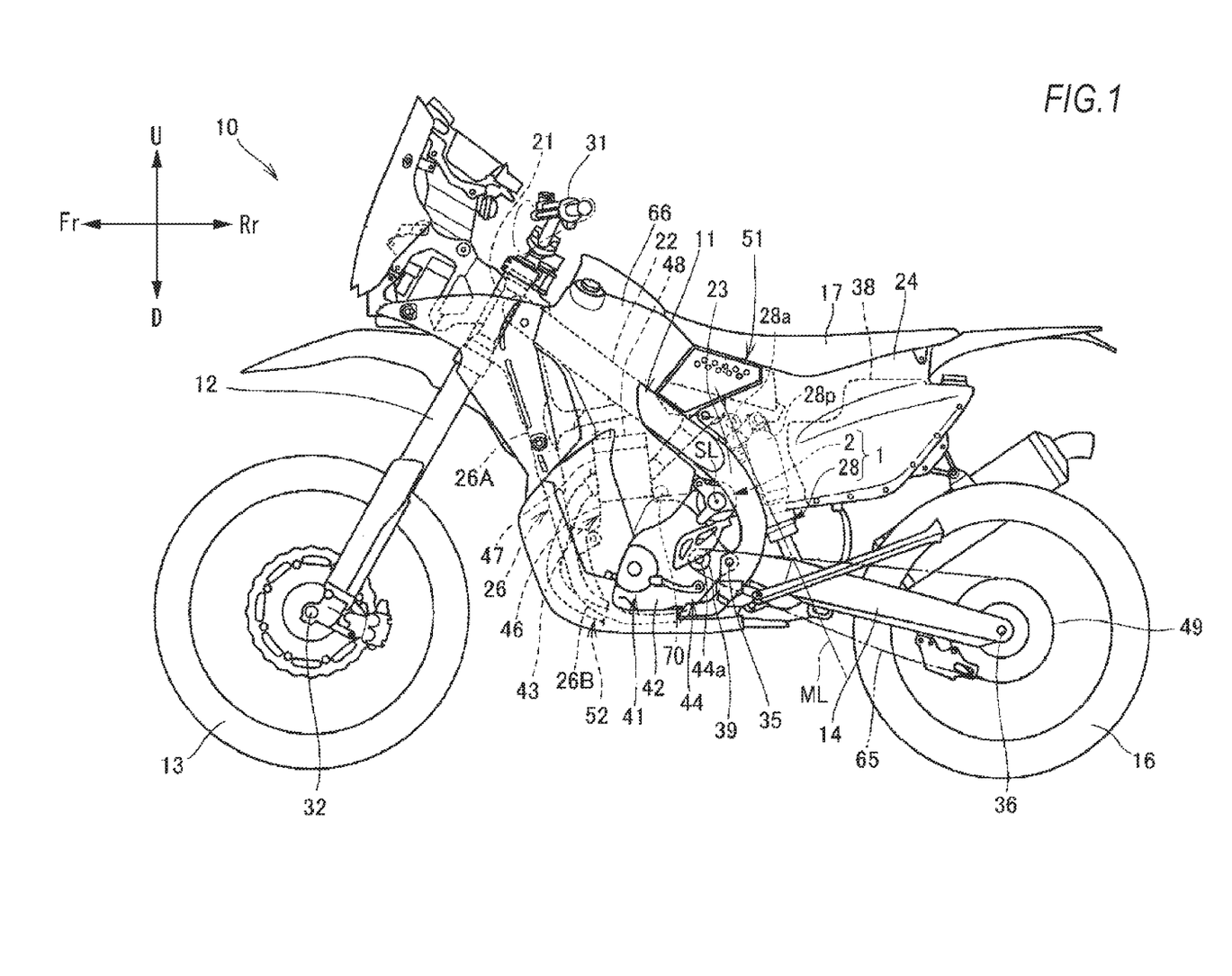
FIG. 1 is a left side view of a motorcycle according to an embodiment of the present invention.

FIG. 1 is a left side view of an entire motorcycle 10 according to an embodiment of the present invention.

As shown in FIG. 1, the motorcycle 10 includes a vehicle body frame 11 which includes a head pipe 21, a pair of right and left main frames 22, a pair of right and left center frames 23, a seat frame 24, and a down frame 26. The motorcycle 10 is a straddle-type vehicle for a rally in which a front wheel 13 is supported by a front portion of the vehicle body frame 11 via a front fork 12, a rear wheel 16 is supported by a rear portion of the vehicle body frame 11 via a swing arm 14, and a riding seat 17 is supported by an upper portion of the vehicle body frame 11.

The head pipe 21 constitutes a front end portion of the vehicle body frame 11, and the front fork 12 is steerably supported by the head pipe 21. A bar handle 31 is attached to an upper end portion of the front fork 12, and the front wheel 13 is supported by a lower end portion of the front fork 12 via an axle 32.

The main frame 22 linearly extends obliquely rearward and downward from the head pipe 21 in a side view. The center frame 23 is curved in a substantially arc shape so as to be convex rearward from a rear end portion of the main frame 22, and a pivot shaft 35 extending in a vehicle width direction is supported at a position near a lower side of a portion which is curved most rearward. Further, a front end portion of the swing arm 14 is vertically swingably supported by the pivot shaft 35, and the rear wheel 16 is supported at a rear end portion of the swing arm 14 via an axle 36.

The seat frame 24 is configured as a monocoque resin frame, for example, and is attached to the pair of right and left main frames 22 and the pair of right and left center frames 23 (a left frame 23L, a right frame 23R). The riding seat 17 is attached on the seat frame 24, and a resin made rear fuel tank 38 is attached in a rear portion of the seat frame 24.

The down frame 26 includes a down frame upper portion 26A configuring an upper portion thereof and a pair of left and right down frame lower portions 26B configuring a lower portion thereof. The down frame upper portion 26A extends substantially downward from the head pipe 21 at an angle steeper than that of the main frame 22. The down frame lower portions 26B extend downward from a lower end portion of the down frame upper portion 26A in a side view and branch to the left and right, and further bend and extend substantially horizontally rearward so as to connect with lower end portions of the center frames 23.

A plurality of cross pipes extending in the vehicle width direction are passed to the left and right center frames 23, and a cushion unit 28 is disposed between a cross pipe 27 (see FIG. 7) provided at an upper side and the swing arm 14.

An engine 41 is supported by the down frame lower portion 26B of the vehicle body frame 11 and the pivot shaft 35. The engine 41 includes a crankcase 42 and a cylinder portion 43 extending upward from a front upper portion of the crankcase 42, and a transmission 44 is attached to a rear portion of the crankcase 42. A starter motor 70 and an actuator unit 2 (described later) are disposed in order from the front of the vehicle body in an engine stepped portion 41d formed by a rear surface 43r of the cylinder portion 43 and an upper surface 42u of the crankcase 42 (see FIG. 2).

The cylinder portion 43 includes a cylinder block 46 attached to the crankcase 42, a cylinder head 47 attached to an upper end portion of the cylinder block 46, and a head cover 48 covering an upper opening of the cylinder head 47. Further, an intake device 51 is connected to a rear surface of the cylinder head 47, and an exhaust device 52 is connected to a front surface of the cylinder head 47.

A drive sprocket 39 is attached to an output shaft 44a of the transmission 44. A chain 65 is wound around the drive sprocket 39 and a driven sprocket 49 provided integrally on the rear wheel 16, so that driving force is transmitted from the transmission 44 to the rear wheel 16.

A pair of left and right front fuel tanks 66 are disposed on both sides of the main frame 22, the down frame 26 and the engine 41. In a rally competition, since the vehicle runs over a long distance, a large tank capacity shall be ensured by the pair of left and right front fuel tanks 66 and the rear fuel tank 38.

Figure 2:
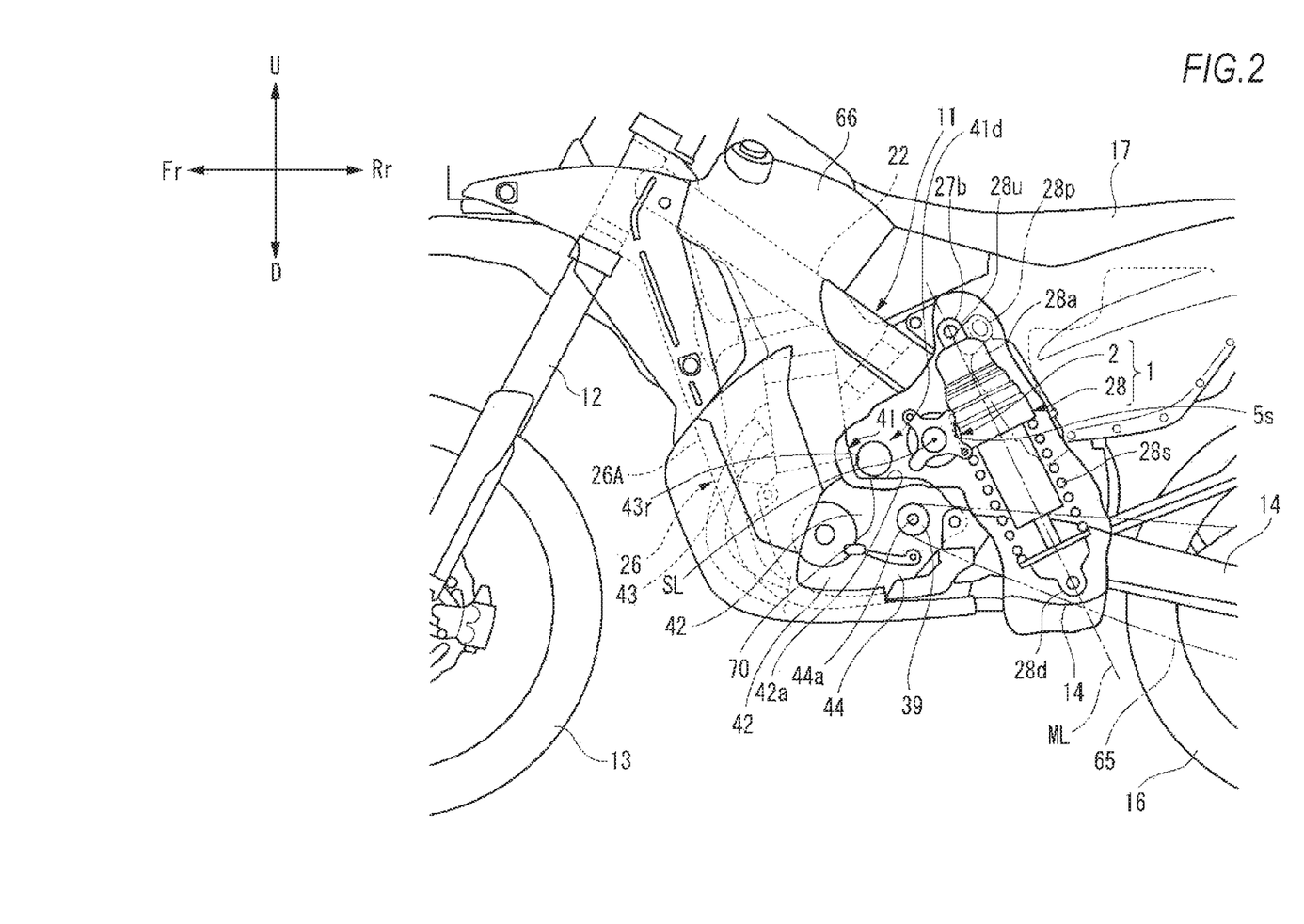
FIG. 2 is a partially enlarged side view of the motorcycle shown in FIG. 1 illustrating an actuator unit and a cushion unit by taking out a part of the motorcycle.
Figure 3:
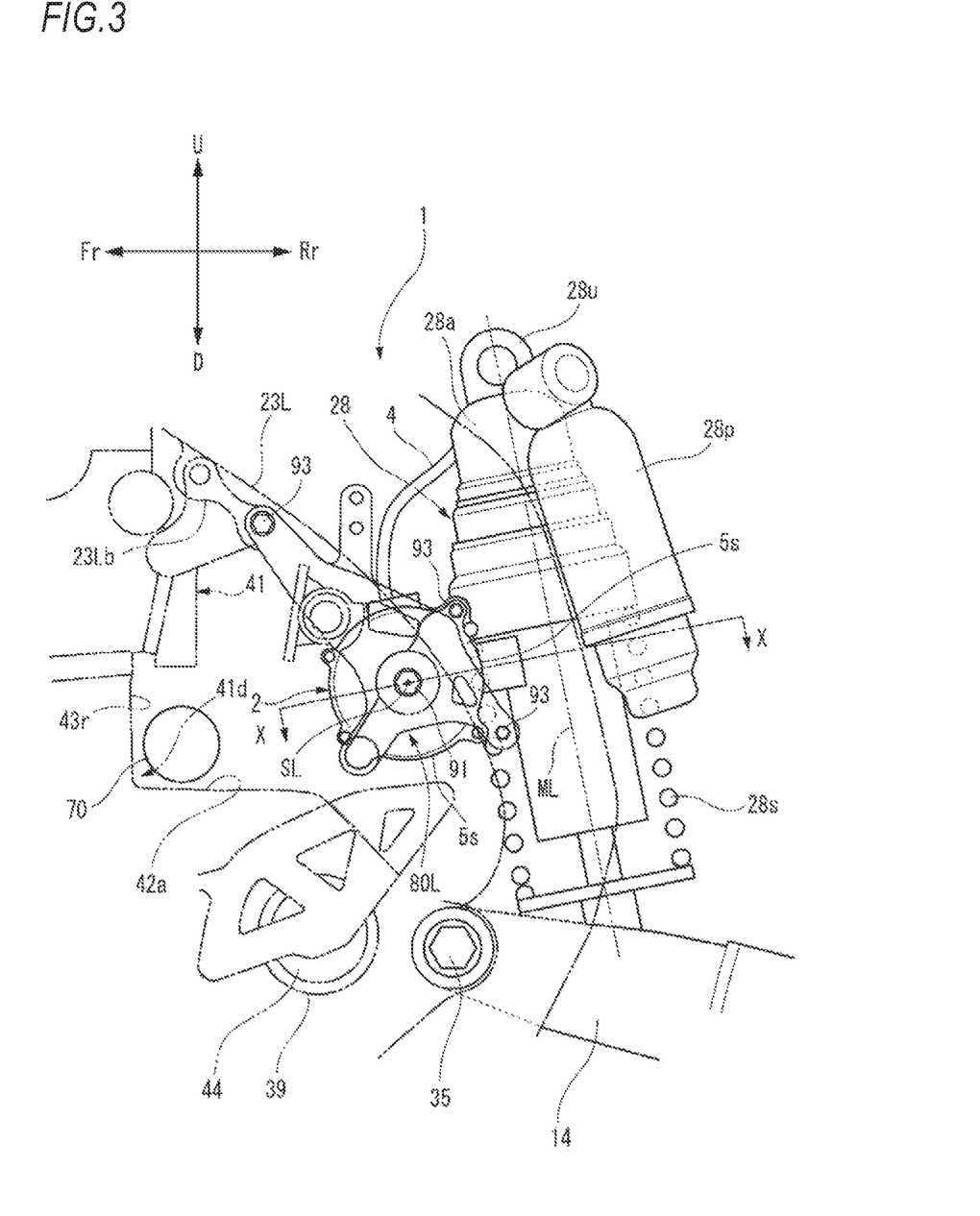
FIG. 3 is an enlarged side view of the actuator unit and the cushion unit.

FIG. 2 is a partially enlarged side view of the motorcycle 10 shown in FIG. 1 illustrating the actuator unit 2 and the cushion unit 28 by taking out a part of the motorcycle. FIG. 3 is an enlarged side view of the actuator unit 2 and the cushion unit 28.

As shown in FIGS. 2 and 3, below the seat frame 24, a vehicle height adjustment device 1 which elastically supports the seat frame 24 and can adjust a height of the seat frame 24 is provided between the seat frame 24 and the swing arm 14. The vehicle height adjustment device includes the substantially tubular actuator unit 2 extending in a left-right direction of the vehicle, and the substantially cylindrical cushion unit 28 extending in an upper-lower direction of the vehicle. The actuator unit 2 and the cushion unit 28 are connected with each other by a pipe 4 of a hydraulic system. Further, an actuator control device 30 (see FIG. 4) for controlling the actuator unit 2 is connected to the actuator unit 2.

Hereinafter, structures of the actuator unit 2 and the cushion unit 28 will be described in detail with reference to FIGS. 4 to 8.

Figure 4:
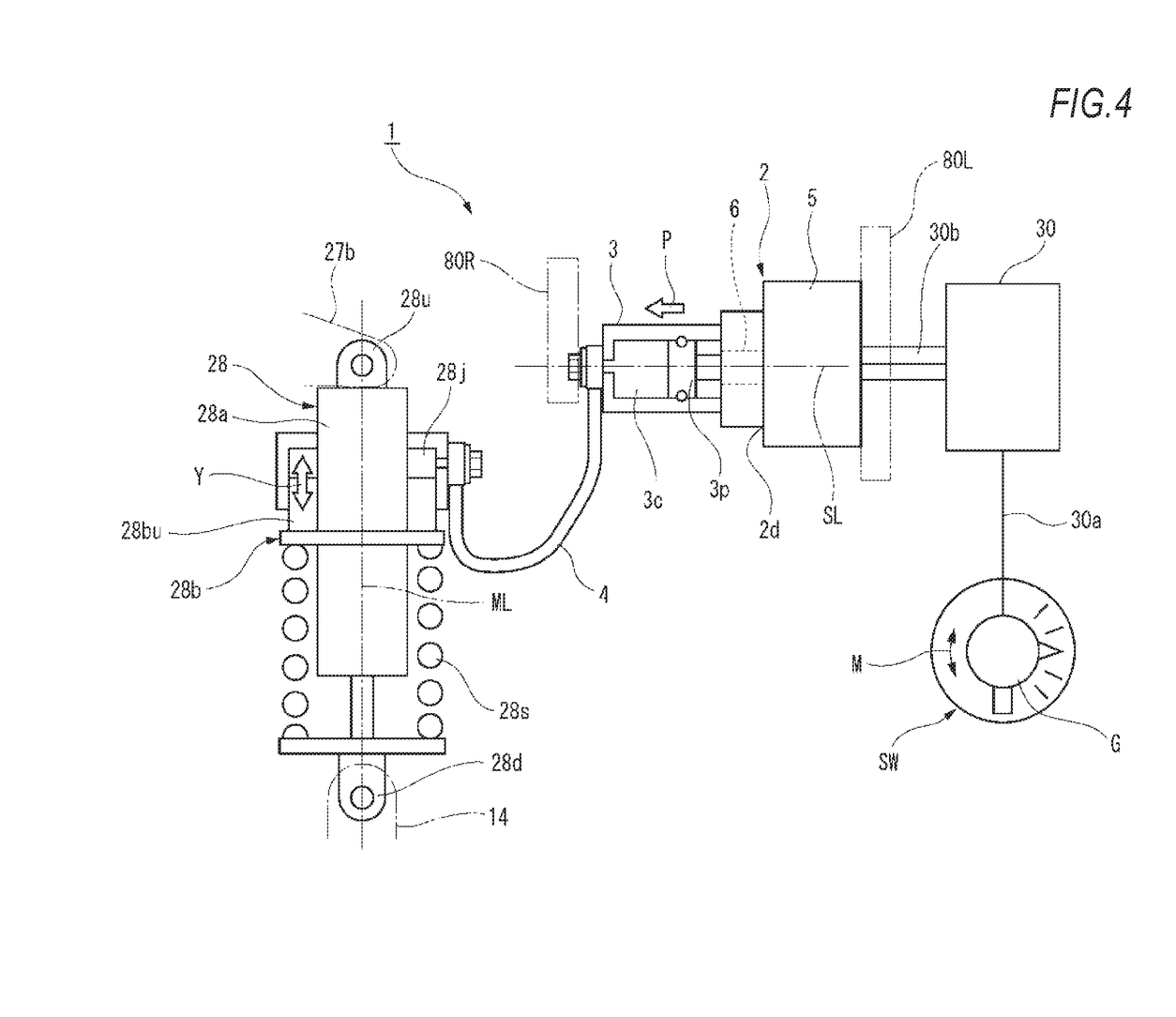
FIG. 4 is a schematic diagram of the actuator unit and the cushion unit in the motorcycle shown in FIG. 1.
Figure 5:
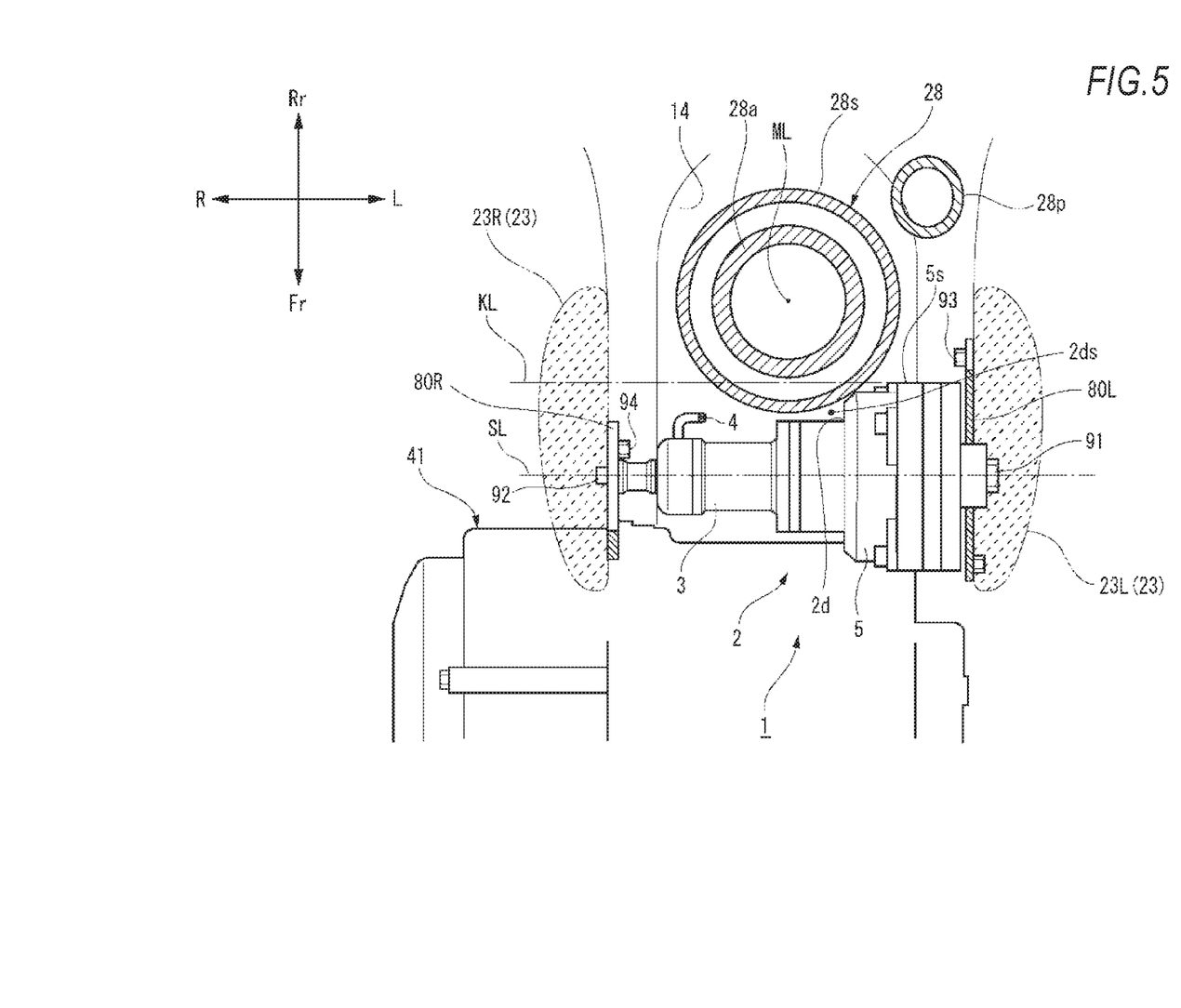
FIG. 5 is a cross sectional view taken along a line X-X in FIG. 3.
Figure 6:
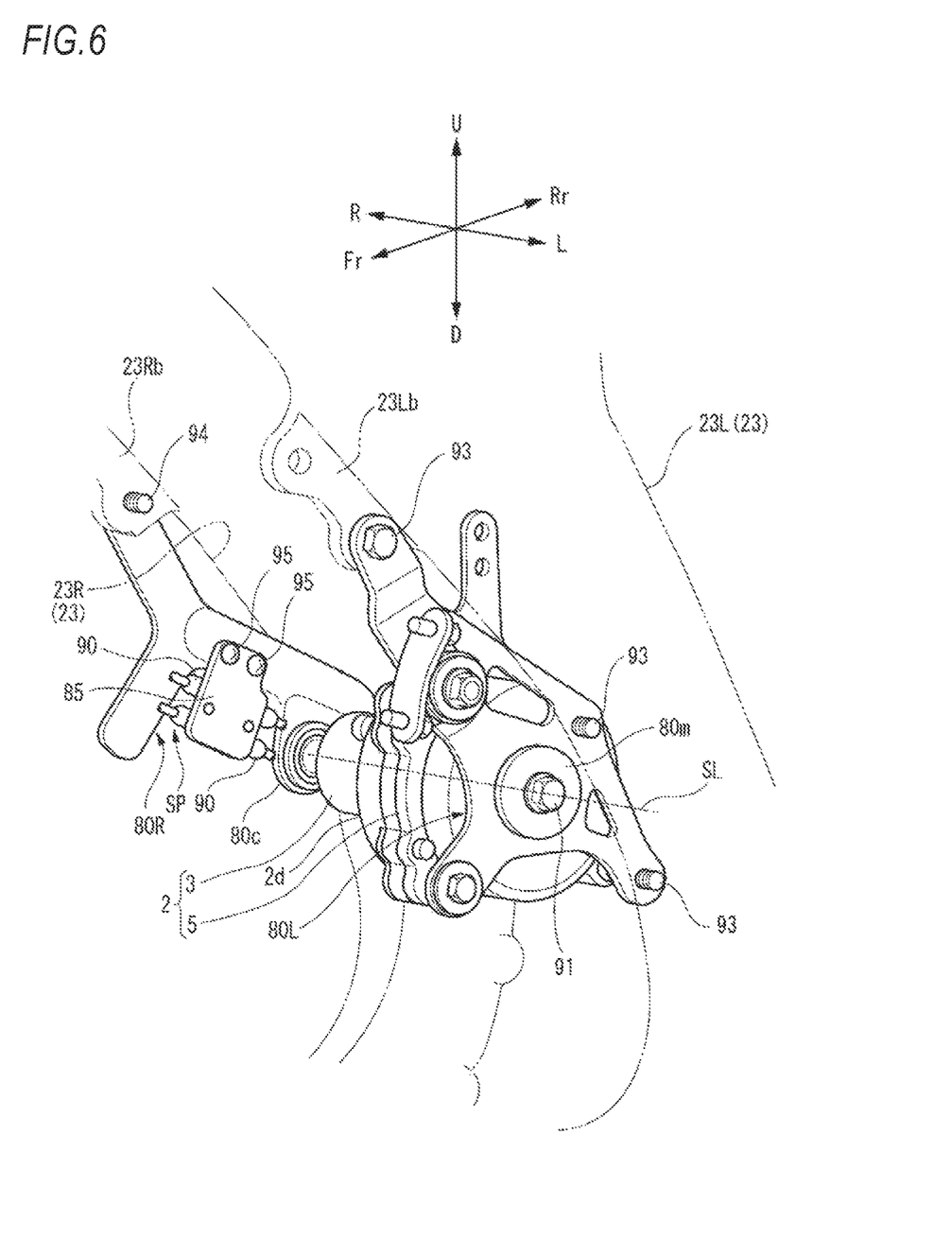
FIG. 6 is a perspective view of the actuator unit as viewed from a front left side of the vehicle to illustrate a state where the actuator unit is attached to a vehicle body frame as shown in FIG. 2.
Figure 7:
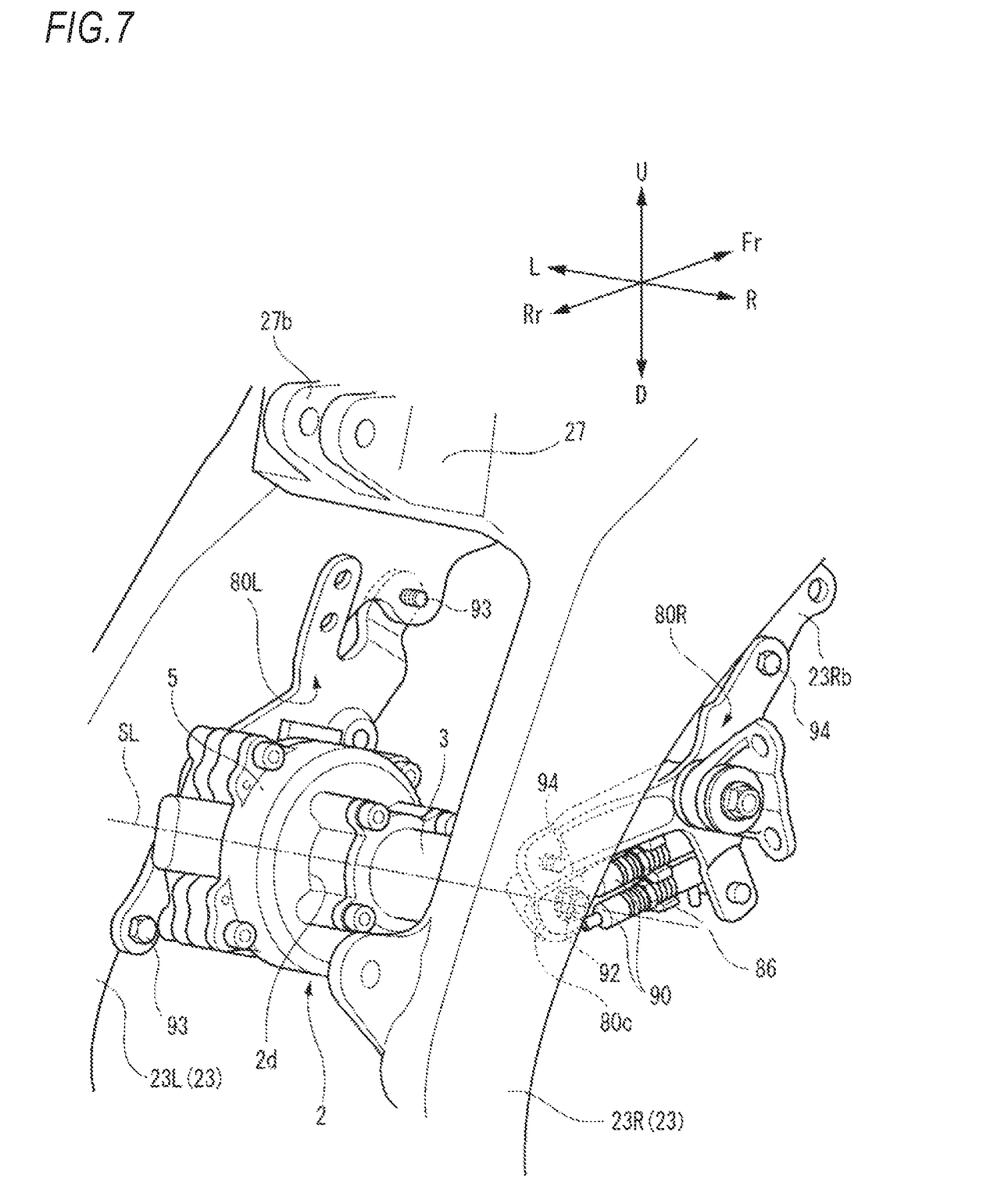
FIG. 7 is a perspective view of the actuator unit as viewed from a rear right side of the vehicle to illustrate a state where the actuator unit is attached to the vehicle body frame as shown in FIG. 2.
Figure 8:
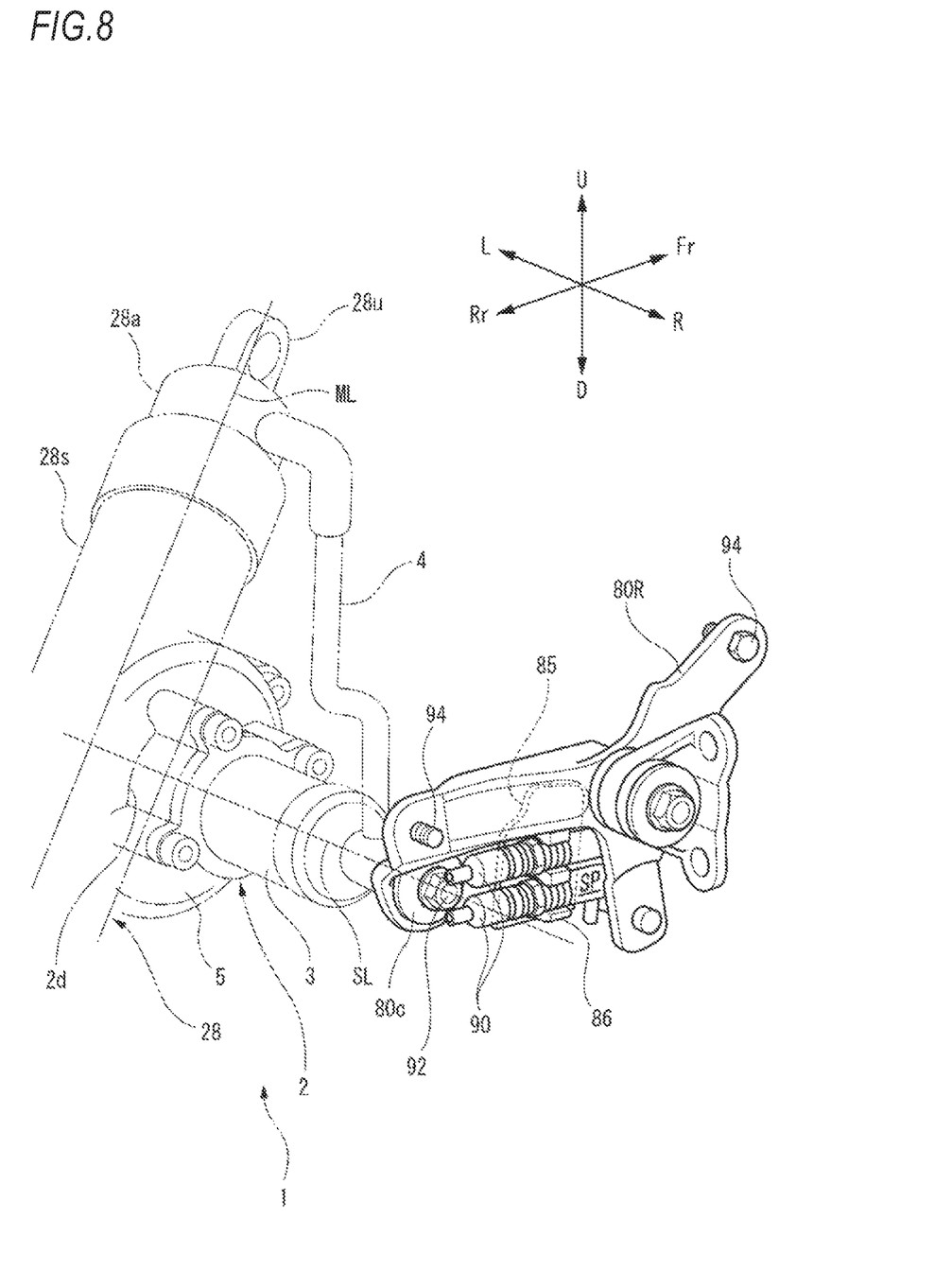
FIG. 8 is an enlarged perspective view of an attachment stay shown in FIG. 7.
Figure 9:
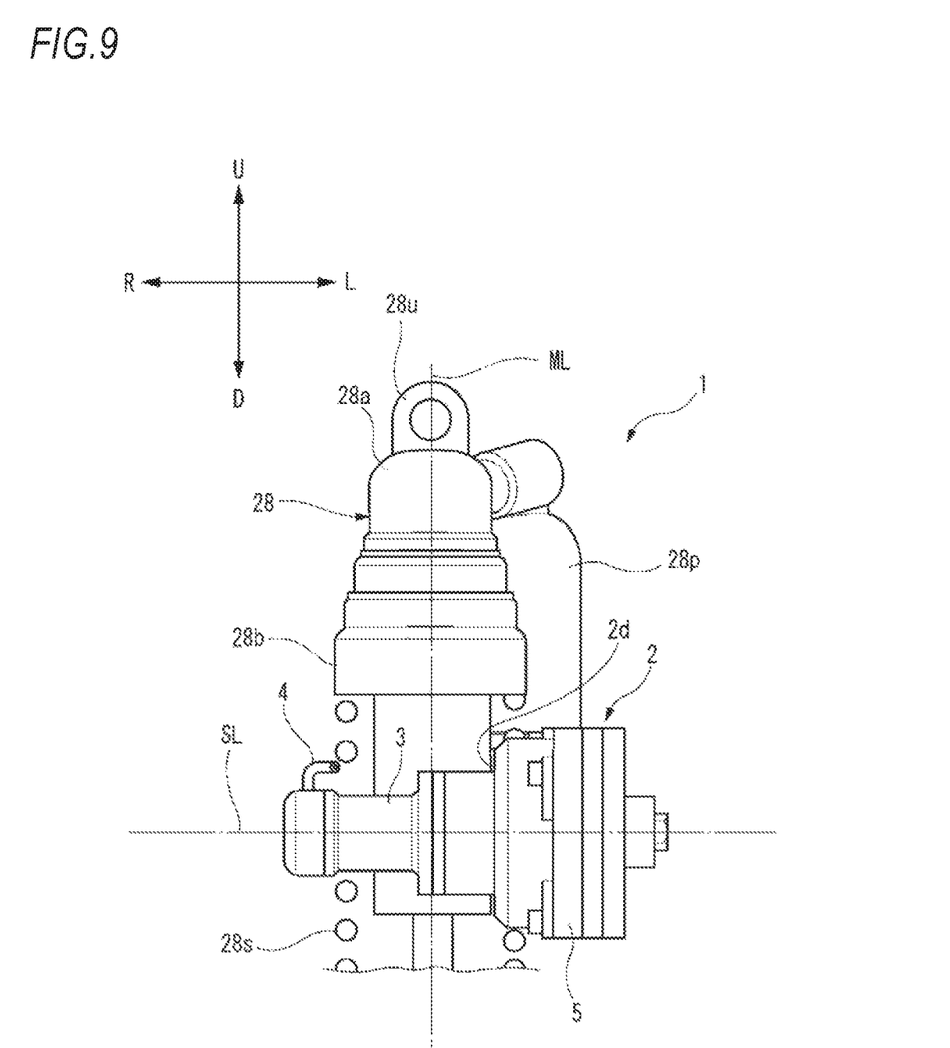
FIG. 9 is a front view of the actuator unit and the cushion unit in the motorcycle shown in FIG. 1 as viewed from the front of the vehicle.

FIG. 4 is a schematic diagram of the actuator unit 2 and the cushion unit 28, FIG. 5 is a cross sectional view taken along a line X-X in FIG. 3, FIG. 6 is a perspective view of the actuator unit 2 as viewed from a front left side of the vehicle to illustrate a state where the actuator unit 2 is attached to the vehicle body frame 11, FIG. 7 is a perspective view of the actuator unit 2 as viewed from a rear right side of the vehicle to illustrate a state where the actuator unit 2 is attached to the vehicle body frame 11. FIG. 8 is an enlarged perspective view of a right attachment stay 80R, and FIG. 9 is a front view of the actuator unit 2 and the cushion unit 28 as viewed from the front of the vehicle.

As shown in FIG. 4, the actuator unit 2 includes a cylinder 3, a piston 3*p* slidably inserted in the cylinder 3, a pump chamber 3*c* connected to one end of a pipe 4 and partitioned by the piston 3*p* in the cylinder 3, and a motor 5 with a diameter larger than that of the cylinder 3. A ball screw 6 is provided in the motor 5. The ball screw 6 converts a rotational motion of the motor 5 into a linear motion of the piston 3*p*. The cylinder 3 and the motor 5 have a same axis line SL. In other words, the motor 5 rotates around an axis of the cylinder 3.

The cushion unit 28 includes a substantially tubular cushion main body 28*a* and a suspension spring 28*s*. An upper end attachment portion 28*u* of the cushion main body 28*a* is supported by a cross pipe bracket 27*b* of the cross pipe 27 (see FIG. 7), and a lower end attachment portion 28*d* is supported by the swing arm 14. A spring receiving portion 28*b* supporting one end (upper end) of the suspension spring 28*s* is provided at a lower side of the cushion main body 28*a*. The spring receiving portion 28*b* has a piston function that an upper spring receiving portion 28*bu* thereof can move up and down (in a direction of arrow Y) in a jack chamber 28*j*. That is, the spring receiving portion 28*b* can receive hydraulic pressure P of the pump chamber 3*c* of the cylinder 3 by the pipe 4 connected to the jack chamber 28*j* and move up and down in the jack chamber 28*j*. Incidentally, the cushion unit 28 according to the present embodiment is configured such that a tubular pressure raising unit 28*p* controlling the hydraulic system is provided adjacent to the cushion main body 28*a* at a lower portion of the upper end attachment portion 28*u* (see FIG. 3).

The motor 5 of the actuator unit 2 is controlled by appropriately rotating a knob G of an operation switch SW (in a direction of arrow M), for example. That is, an operation signal of the operation switch SW is transmitted to the actuator control device 30 via a signal line 30*a*, and then sent from the actuator control device 30 to the motor 5 via a signal line 30*b* so as to perform a movement operation of the piston 3*p*. When the piston 3*p* moves forward, a volume of the pump chamber 3*c* decreases, the hydraulic pressure P is supplied to the jack chamber 28*j*, a volume of the jack chamber 28*j* increases, and the spring receiving portion 28*b* moves downward in FIG. 4, so that a vehicle height can be increased. On the contrary, when the hydraulic pressure P is discharged from the jack chamber 28*j*, the spring receiving portion 28*b* is moved upward in FIG. 4 by a biasing force of the suspension spring 28*s* compressing the jack chamber 28*j*, and the volume of the jack chamber 28*j* decreases, so that the vehicle height is decreased.

The actuator unit 2 and the cushion unit 28 are disposed as shown in FIG. 5. In a cross section orthogonal to a motion line ML of the cushion unit 28, a part of the cushion unit 28 is positioned closer to the cylinder 3 than an imaginary line KL drawn from an outer peripheral surface 5*s* of the motor 5 and in parallel with the axis line SL. That is, the actuator unit 2 has a stepped portion 2*d* formed by an outer diameter difference between a large diameter portion and a small diameter portion, and is configured such that a part of the cushion unit 28 enters a space 2*ds* formed by the stepped portion 2*d*. Therefore, the outer peripheral surface 5*s* of the motor 5 of the actuator unit 2 is closely provided to overlap with the cushion unit 28 as viewed from an axial direction of the motor 5. In the motor 5 and the cylinder 3 which have the same axis line SL and different diameters, the stepped portion 2*d* may be formed by the motor 5 which is the large diameter portion and the cylinder 3 which is the small diameter portion, or may also be formed by a large diameter portion and a small diameter portion of the motor 5 which has different diameters by itself.

As shown in FIGS. 1 and 2, the axis line SL of the actuator unit 2 is orthogonal to a front-rear direction and the upper-lower direction of the vehicle, and that is, the actuator unit 2 horizontally extends in the left-right direction. Further, as shown in FIG. 9, the actuator unit 2 is disposed such that the axis line SL thereof intersects, more preferably orthogonal to the motion line ML of the cushion unit 28 which extends in the upper-lower direction when viewed from the front-rear direction of the vehicle.

Further, the actuator unit 2 is disposed between the engine 41 and the cushion unit 28 (see FIGS. 2, 3, and 5). Further, the actuator unit 2 is disposed adjacent to the starter motor 70 in the above-mentioned engine stepped portion 41*d*. As can be clearly seen from FIG. 3, the engine 41, the starter motor 70, the actuator unit 2 and the cushion unit 28 are disposed on the motorcycle 10 in this order from the front side of the vehicle body.

Hereinafter, a support structure of the actuator unit 2 will be described with reference to FIGS. 6 and 7.

The actuator unit 2 is supported on both sides in an axis line SL direction. Specifically, the actuator unit 2 is supported on both sides in the axis line SL direction and on the axis line SL. The actuator unit 2 is fastened to a left attachment stay 80L by a left fixing bolt 91 (see FIG. 6), and is fastened to the right attachment stay 80R by a right fixing bolt 92 (see FIG. 7).

The left attachment stay 80L and the right attachment stay 80R have different shapes on the left and right. As shown in FIG. 6, the left attachment stay 80L attached to the left frame 23L is a substantially rhombic plate shaped member taking a motor fixing portion 80*m* to which the left fixing bolt 91 is attached as a center. The left attachment stay 80L has attachment holes at four vertexes of the rhombus, and attachment bolts 93 are inserted into three attachment holes out of the four attachment holes and fastened to an inner side of the left frame 23L. Specifically, among the three attachment bolts 93, two of which at an upper rear side and a lower rear side are screwed from the inner side of the left frame 23L, and the attachment bolt 93 at an upper front side is screwed, from an outer side, to a bracket 23L*b* protruding downward from a front side of the left frame 23L, so that the left attachment stay 80L is attached to the left frame 23L. Incidentally, the remaining one attachment hole at a lower front side is a motor fixing portion fastened to the actuator unit 2.

Meanwhile, as shown in FIGS. 6 and 7, the right attachment stay 80R attached to the right frame 23R is a plate shaped member with a substantially Y shape which extends to the front side of the vehicle from an upper portion of a cylinder fixing portion 80*c* to which the right fixing bolt 92 is attached and extends obliquely upward and downward from a front end portion. Further, the right attachment stay 80R is fastened to an inner side of the right frame 23R via two attachment bolts 94. Specifically, the rear attachment bolt 94 is screwed from the inner side of the right frame 23R, and the front attachment bolt 94 is screwed, from an outer side, to a bracket 23R*b* protruding downward from a front side of the right frame 23R, so that the right attachment stay 80R is attached to the right frame 23R.

In this way, the left attachment stay 80L and the right mounting stay 80R are attached to the inner side of the left frame 23L and the inner side of the right frame 23R, respectively. Further, in the present embodiment, as shown in FIGS. 6 and 8, the right attachment stay 80R has a protruding piece 85 which forms a space SP with the right frame 23R. That is, the protruding piece 85 is fixed to an inner side of the right attachment stay 80R via a pair of screws 95, for example, and extends downward. Furthermore, a holder 86 is provided at an outer side of the protruding piece 85, and a component 90 such as a connector, for example, is detachably mounted to the holder 86.

As described above, according to the present embodiment, the vehicle height adjustment device 1 which elastically supports the seat frame 24 and can adjust the height of the seat frame 24 is provided below the seat frame 24, and the vehicle height adjustment device 1 includes the actuator unit 2 and the cushion unit 28. Since the actuator unit 2 is disposed between the cushion unit 28 and the engine 41, the actuator unit 2 can be disposed near the gravity center of the vehicle body, and a heavy load can be centralized on the gravity center of the vehicle body accordingly. Therefore, weight balance of the vehicle can be improved.

Since the actuator unit 2 is disposed in the engine stepped portion 41d formed by the cylinder portion 43 and the crankcase 42 of the engine 41, the actuator unit 2 can be disposed by utilizing the stepped portion 41d formed by the cylinder portion 43 and the crankcase 42 of the engine 41 and the layout property is better.

Since the engine 41, the starter motor 70, the actuator unit 2 and the cushion unit 28 are disposed in this order from the front side of the vehicle body, the layout property is better and a heavy load can be centralized on the gravity center of the vehicle body.

Since the actuator unit 2 has the cylinder 3 and the motor 5 which have the same axis line SL extending in the left-right direction of the vehicle, the layout property is better and the weight balance on the left and right can be improved.

Since the actuator unit 2 is supported by the left frame 23L and the right frame 23R of the vehicle body frame 11 on both sides of the axial direction, the actuator unit 2 is securely fixed across the left frame 23L and the right frame 23R and vibration resistance thereof can be enhanced. Further, the occurrence of moment can be suppressed.

Although one embodiment of the present invention has been described above, the present invention is not limited to the embodiment but can be modified as appropriate.

For example, a motorcycle has been described in the embodiment described above, but the inventive concept of the present invention may be applied to other saddle-type vehicles such as a buggy.

The invention claimed is:

1. A saddle-type vehicle comprising:
    a vehicle body frame including a main frame extending obliquely rearward and downward from a head pipe, a down frame extending downward from the head pipe and supporting an engine, and a seat frame extending rearward from the main frame and supporting a riding seat, wherein a front wheel is supported by a front portion of the vehicle body frame via a front fork, and a rear wheel is supported by a rear portion of the vehicle body frame via a swing arm; and
    a vehicle height adjustment device provided below the seat frame to elastically support the seat frame and configured to adjust a height of the seat frame,
    wherein the vehicle height adjustment device includes an actuator unit and a cushion unit,
    wherein the actuator unit is disposed between the cushion unit and the engine,
    wherein the actuator unit includes a cylinder and a motor,
    wherein the cylinder and the motor have a same axis line, and
    wherein the axis line extends in a left-right direction of the vehicle.

2. The saddle-type vehicle according to claim 1,
    wherein the actuator unit is disposed in an engine stepped portion formed by a cylinder portion and a crankcase of the engine.

3. The saddle-type vehicle according to claim 1, further comprising:
    a starter motor,
    wherein the engine, the starter motor, the actuator unit, and the cushion unit are disposed in this order from a front side of a vehicle body.

* * * * *